United States Patent [19]

Hsu

[11] Patent Number: 5,178,085
[45] Date of Patent: Jan. 12, 1993

[54] WAVE CANCELLATION MULTIHULL SHIP

[75] Inventor: Chun-Che Hsu, Silver Spring, Md.

[73] Assignee: The United States of America as represented by the Secretary of the Navy, Washington, D.C.

[21] Appl. No.: 842,303

[22] Filed: Feb. 26, 1992

[51] Int. Cl.$^5$ ............................................... B63B 1/12
[52] U.S. Cl. ...................................... 114/61; 114/283
[58] Field of Search ................................. 114/61, 283

[56] References Cited

U.S. PATENT DOCUMENTS

| | | | |
|---|---|---|---|
| 1,888,107 | 11/1932 | Batt | 114/283 |
| 3,898,946 | 8/1975 | Zadrozny et al. | 114/61 |
| 4,174,671 | 11/1979 | Seidl | 114/61 |
| 4,926,773 | 5/1990 | Manor | 114/61 |
| 4,986,204 | 1/1991 | Yoshida | 114/61 |

FOREIGN PATENT DOCUMENTS 1169344  9/1958  France ................................ 114/61

OTHER PUBLICATIONS

Hsu, C. et al., "Wave Cancellation Multihull Ship Concept" Independent Research/Indep. Exploratory Development Feb. 1991 pp. 25–43.

Primary Examiner—Jesûs D. Sotelo
Attorney, Agent, or Firm—Gary G. Borda

[57] ABSTRACT

The invention is directed to an improved multihull vessel for enhanced seakeeping and reduced hydrodynamic fluid resistance and a method for minimizing the wavemaking resistance of multihull vessels. Lower wavemaking resistance is realized while maintaining the advantageous seakeeping characteristics of small waterplane area multihull vessels. By the proper arrangement of slender, tapered hull elements, the present invention produces favorable wave interference effects and smaller surface wave disturbances resulting in lower wavemaking resistance. A tapered hull design provides a small waterplane area for enhanced seakeeping while producing smaller surface wave disturbances and reduced hull interaction resistance due to the lack of surface discontinuities. In addition, proper arrangement of hull elements provides favorable wave interference.

17 Claims, 10 Drawing Sheets

Setback = 99.15 ft

Setback = 155.91 ft

WAVE CANCELLATION MULTIHULL SHIP

STATEMENT OF GOVERNMENT RIGHTS

The invention described herein may be manufactured and used by or for the the Government of the United States of America for governmental purposes without the payment of any royalties thereon or therefor.

BACKGROUND OF THE INVENTION

1. Field of Invention

The present invention relates generally to ship hullforms and, more particularly, to ship designs with both improved seakeeping and improved resistance characteristics.

2. Brief Description of Related Art

In recent years, there has been renewed interest in the multihull ship concept. Most early multihull ship designs were based on the twin-hull catamaran concept wherein two conventional displacement or planing hulls were connected by an above-the-water cross structure. Such ship designs characteristically possess small cross sectional areas in the horizontal plane of the water surface (small waterplane area) when compared to the maximum horizontal cross section of their above-the-water hulls or to the waterplane area of a typical monohull. The principal advantage of small waterplane are ships is their improved seakeeping characteristics in high sea states.

Improved seakeeping (dynamic stability) has been the basis of interest in small Waterplane Area Twin Hull (SWATH ship arrangements. SWATH ships provide a platform relatively isolated from ocean surface disturbances. Buoyancy is provided by submarine like twin-hulls located well below the water surface, which, like submarines, escape the buffeting of wind and waves. The lower hulls are connected by means of surface-piercing struts to the cross structure located well above the water surface. The struts, which pierce the water surface (surface-piercing struts), present a much smaller waterplane area to dynamic wave action than do conventional monohull or catamaran ship hulls which displace and ride on the water surface.

However, the best SWATH ship arrangements require large amounts of propulsive power, when compared with monohulls, because of the large wetted surface area, and consequently high frictional resistance, of the twin-hulls. In addition, multihull ships have an additional component of resistance, interaction resistance between the multiple hulls (also referred to as interference resistance), not experienced by monohull ships. As a result, there has been a continuous search to relieve the large resistance penalty which accrues from the increased wetted surface area and multiple hull interaction of multihull ship compared to monohull ships of the same displacement.

The forces experienced by ships moving in calm water consist primarily of the drag forces attributed to viscous fluid friction (viscous or frictional resistance) and to the production of waves (wavemaking resistance). Frictional resistance is confined to a thin layer adjacent to the ship's surface and is generally dependent upon the wetted surface area of the hullform. Frictional resistance is normally estimated using well known empirical frictional extrapolator methods. Wavemaking resistance of multihull ships is composed of components produced by the wavemaking characteristics of each hull and by the wavemaking interactions of the various hull elements. The wavemaking resistance of thin or slender ships can be analyzed by Michell's thin ship theory. Experimental studies have shown very good agreement between theoretically and experimentally determined wavemaking resistance of slender hullforms such as SWATH ships and other slender hulled multihull ships.

The O'Neill Hullform (OHF), designed for the U.S. Navy for superior roll stability and damage protection of the inner hull against antiship missiles, is a promising example of a trimaran arrangement of hulls. The OHF features a large submerged center body and surface-piercing struts connected to the upper hull. Experimental and analytical studies conducted by the Navy have demonstrated the advantage, in terms of total resistance, of the OHF at speeds above 21 knots when compared to a typical 4000 ton SWATH configuration.

The O'Neill Hullform (OHF) has a large, submerged center hull with a connecting surface-piercing strut and a pair of identical surface-piercing outer strut-like hulls placed symmetrically to the center hull. The center-body-plus-strut provides approximately 80 percent of the ship buoyancy. The outer hulls are shorter in length and smaller in maximum width than the center body.

The wavemaking resistance of multihull ships has three main components: the center hull (body-plus strut for the OHF) component: the outer hull component and the interaction components between the outer hulls and the center hull. In addition, the center hull component of the OHF is composed of components due to the lower body, the surface-piercing strut, and the interaction between the center strut and body due to the existence of a sharp discontinuity at the strut-body intersection.

The inventor has determined that, depending upon the hull geometry and relative positioning among multiple hull elements, the interaction wavemaking resistance component can be either detrimental or favorable to the total wavemaking resistance. Large resistance improvements, therefore, may be possible if proper alterations are made to the relative positioning among the multiple hull elements. Furthermore, since a major components of wavemaking resistance of the OHF arise from the center body and center body/center strut interactions, additional resistance improvements may be possible if proper alterations are made to the elements of the center hull (center body and center strut).

SUMMARY OF THE INVENTION

In accordance with the present invention, an improved hullform for enhanced seakeeping and reduced hydrodynamic fluid resistance and a method for minimizing the wavemaking resistance of multihull vessels is provided.

The operation of the Wave Cancellation Multihull (WCM) ship and the method for minimizing the wavemaking resistance of multihull vessels of the present invention is based on the fact that the proper arrangement of slender, tapered hull elements can produce favorable wave interference effects and smaller surface wave disturbances resulting in lower wavemaking resistance. Lower wavemaking resistance is realized while maintaining the advantageous seakeeping characteristics of small waterplane area multihull vessels. The tapered hull design provides a small waterplane area for enhanced seakeeping while producing smaller surface wave disturbances and reduced hull interaction resistance due to the lack of surface discontinuities. In addition, proper arrangement of hull elements provides favorable wave interference. The proper longitudinal placement of outer hulls in relationship to center hull (setback) depends on the ship design speed and is generally fixed. However, in certain applications it may be advantageous to minimize wavemaking resistance over a range of ship speeds by moving the outer hulls longitudinally along tracks thus varying setback with speed. Although the total wetted surface area of a WCM ship is comparable to that of a small waterplane area twin hull (SWATH) ship or an O'Neill hullform (OHF) ship of the same displacement, the total resistance of the WCM ship is considerably smaller.

The Wave cancellation Multihull (WCM) ship of the present invention comprises: at least three surface-piercing slender tapered hulls, each of the hulls having a leading edge, a trailing edge and a slender element extending between the leading and trailing edges for providing buoyancy; an above-the-water cross structure rigidly connected to the surface-piercing slender hulls wherein the hulls are held in substantially parallel, transversely spaced alignment and further wherein the hulls are located in a symmetric arrangement about a longitudinal centerline; and at least one of the surface-piercing slender hulls being longitudinally positioned relative to the remaining hulls such that the leading edge of that hull is forward of the leading edge of the remaining hulls whereby favorable wave interference between the wave systems of the forward hull and the remaining hulls occurs resulting in the wavemaking resistance being minimized.

The method for minimizing the resistance of multihull vessels of the present invention comprises the steps of: providing buoyancy by means of a small waterplane area central hull and at least two small waterplane area outer hulls disposed symmetrically on opposite sides of the central hull wherein at least 80 percent of the static buoyant force is provided by the tapered flattened teardrop vertical underwater cross sectional shape of the central hull and wherein the remaining static buoyant force is provided by the tapered flattened teardrop vertical underwater cross sectional shape of the outer hulls; transversely aligning the central hull and outer hulls in substantially parallel, rigid, transversely spaced alignment wherein the distance between the centerlines of the outer hulls is equal to at least 20 percent of the length of the central hull; and longitudinally positioning the central hull and outer hulls relative to each other wherein the leading edge of each of the outer hulls is aft of the leading edge of the central hull whereby favorable wave interference between the wave systems of the central hull and outer hulls occurs such that the wavemaking resistance is minimized.

OBJECTS OF THE INVENTION

Accordingly, it is an object of the present invention to provide a multihull ship and method for improved performance capability in both calm and rough waters.

It is a further object of the present invention to provide a multihull ship design and method that results in favorable surface wave interference and thus reduced interaction and wavemaking resistance.

It is still a further object of the present invention to provide a multihull ship design and method for improved seakeeping characteristics.

Other objects and advantages of the present invention will become apparent to those skilled in the art upon a reading of the following detailed description taken in conjunction with the drawings and the claims supported thereby.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein.

DETAILED DESCRIPTION OF THE PREFERRED EMBODIMENT

Figure 1:
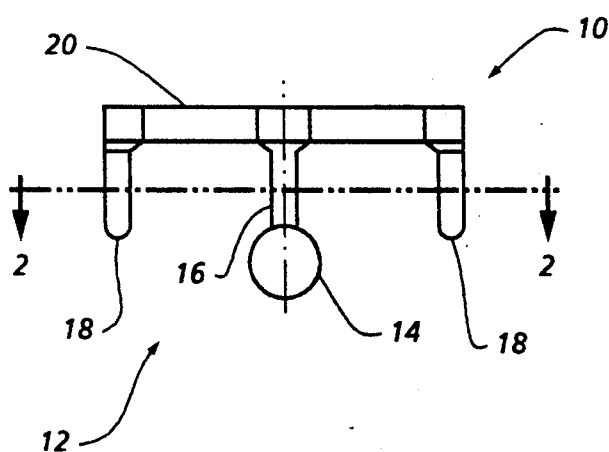
FIG. 1 is a frontal plan view of the O'Neill Hullform.
Figure 2:
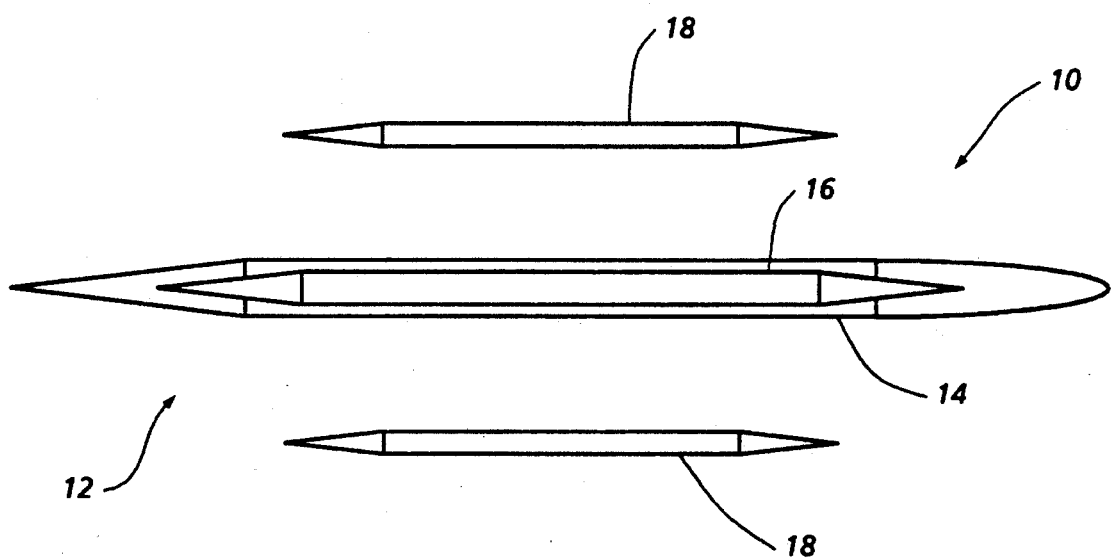
FIG. 2 is a sectional view of the O'Neill Hullform along line 2—2 of FIG. 1.

Referring now to FIGS. 1 and 2, the O'Neill Hullform (OHF) is generally indicated as item 10. The O'Neill Hullform 10 is generally comprised of a center-body-plus-strut 12 and a pair of identical surface-piercing outer hulls 18 placed symmetrically to the center-body-plus-strut 12. Center-body-plus-strut 12 features a large submerged center body 14 and surface-piercing strut 16 connected to the upper hull 20. Outer hulls 18 are shorter in length and smaller in maximum width than center-body-plus-strut 12.

Systematic experimental and numerical analyses conducted by the inventor on variations of the OHF, as a precursor to the Wave cancellation Multihull (WCM) ship concept, are detailed in David Taylor Research center. Independent Research/Independent Exploratory Development Annual Report 91/CT03 IED 1522-010, entitled "Wave Cancellation Multihull Ship Concept," by C. Hsu, G. Lamb, and M. Wilson, pp. 25–43 (Feb 1991), incorporated herein by reference. The theoretical determination of the wavemaking resistance of slender hulled multihull ships is described in the incorporated reference.

In this application, "taper" refers to the smooth, gradual increase in the width of the underwater hull from the minimum thickness, located at the waterline, to the maximum thickness located substantially at the maximum hull draft. In one exemplary embodiment, the underwater taper of the center hull and outer hulls of the present invention can be expressed in the following form:

| | |
|---|---|
| $F_n(X) = (T_n/2)[1 - \lambda(z)]\{1 - [(A_n - X_n)/A_n]\}$ | for $0 < X_n < A_n$ |
| $F_n(X) = T_n/2[1 - \lambda(z)]$ | for $A_n < X_n < B_n$ (1) |
| $F_n(X) = (T_n/2)[1 - \lambda(z)]\{1 - [(X_n - B_n)/(C_n - B_n)]\}$ | for $B_n < X_n < C_n$ | where $C_n$ = length of center hull or outer hulls
$T_n$ = minimum width of center hull or outer hulls
$A_n$ = parabolic nose section length of center hull or outer hulls
$C_n - B_n$ = parabolic tail section length of center hull or outer hulls
$\lambda$ = percent change in width per foot of depth of center hull or outer hulls
$z$ = vertical distance (depth) below the waterline subscript $n = 1, 2,$ or $3$ designates the quantities due to the center hull or outer hulls, respectively.

In this application, the term "setback" refers to the longitudinal distance between the leading edge of the center body (for the OHF) or center hull (for the WCM) and the leading edge of the outer hulls. The term "outer hull spacing" refers to the lateral distance between the centerlines of the two outermost outer hulls.

The term "surface-piercing slender hull" refers to the fact that the long slender small waterplane area "strut-like" portions of the multiple hulls of the present invention projection through the water surface. At the top of the "strut-like" portions, the multiple hulls are connected to the above-the-water cross structure. The "strut-like" portions then pierce the water surface to form a smooth intersection with the increased waterplane area underwater portion of each hull. The buoyant force of conventional monohull ships arises from the large waterplane area monohull riding on and displacing water at the water surface. In contrast, the majority of the buoyant force of the present invention does not arise due to water displaced at the water surface but is produced by the increased waterplane area underwater portions of each hull.

Figure 3:
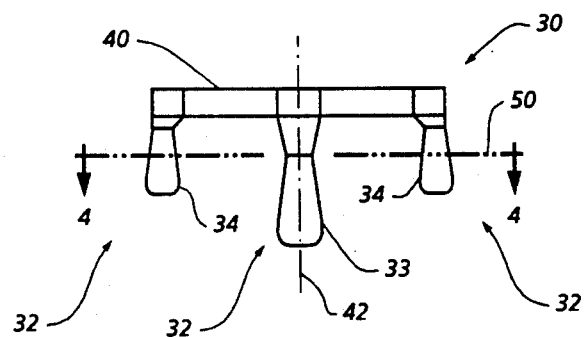
FIG. 3 is a frontal plan view of the Wave Cancellation Multihull ship in accordance with the present invention.
Figure 4:
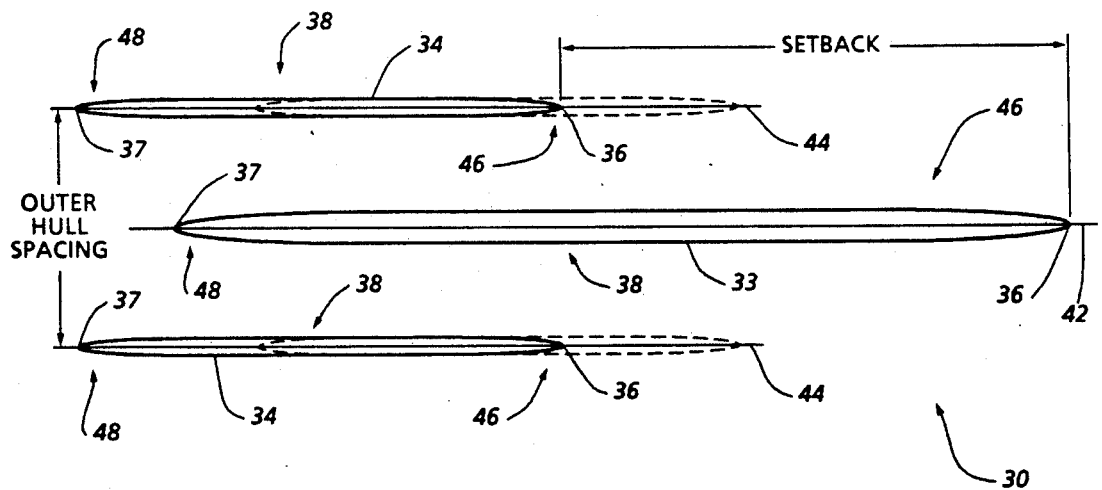
FIG. 4 is a sectional view of the Wave Cancellation Multihull ship along line 4—4 of FIG. 3.

Referring now to FIGS. 3 and 4, the Wave Cancellation Multihull (WCM) ship in accordance with the present invention, generally indicated as item 30, is comprised of a specified arrangement of multiple surface-piercing slender, tapered hulls 32. In the embodiment shown in FIGS. 3 and 4, wave cancellation multihull ship 30 includes three surface-piercing slender hulls 32 indicated as center hull 33 and identical outer hulls 34 disposed symmetrically on opposite sides of center hull 33. Center hull 33 and outer hulls 34 each have a leading edge 36, a trailing edge 37 and a slender tapered element 38 extending between said leading and trailing edges for providing buoyancy. In the preferred embodiment, the distance between outer hull centerlines 42 is equal to at least 20 percent of the length of center hull 33.

The present invention is applicable to ship designs that incorporate three or more slender, tapered hulls. The present invention may include positioning a plurality of center hull plus outer hull combinations together either in parallel or in series. Thus for example, the present invention may provide for a center hull and four laterally spaced outer hulls or, alternatively, a center hull with two forward outer hulls and two aft outer hulls.

Surface-piercing slender hulls 32 (center hull 33 and outer hulls 34 in FIGS. 3 and 4) are connected to above-the-water cross structure 40 such that surface-piercing slender hulls 32 are held in substantially parallel, transversely spaced alignment in a symmetric arrangement about longitudinal centerline 44. Above-the-water cross structure 40 may contain cargo decks, work spaces and any desired superstructure.

In the embodiment shown in FIGS. 3 and 4, the submerged vertical cross sections of center hull 33 and outer hulls 31 have slender. tapered shapes resembling a flattened teardrop wherein no sharp discontinuities are present. Center hull 33 and outer hulls 34 have parabolic nose sections 46 and parabolic tail sections 48. Center hull 33 and outer hulls 34 have small waterplane areas with the minimum underwater waterplane area being located approximately at waterline 50 and with the maximum underwater waterplane area being located substantially at the maximum draft of each hull. In the preferred embodiment of the present invention, the maximum width of center hull 33 and outer hulls 34 (corresponding to their maximum waterplane areas) is between 3 percent and 10 percent of the length of each individual hull. The tapered hull design provides a small waterplane area for enhanced seakeeping while producing smaller surface wave disturbances and reduced hull interaction resistance due to the lack of surface discontinuities.

The shape of center hull 33 and outer hulls 34 can be defined by aforementioned equation (1). However, the present invention is not limited to the shape defined by equation (1) but is applicable to any hull design that incorporates a slender, tapered cross sectional shape with smooth transition between the strut-like surface-piercing portion and the increased waterplane area submerged portion.

Generally, center hull 33 will have a deeper draft and a longer length than outer hulls 34. More specifically, the length of outer hulls 34 is between 44 percent and 54 percent of the length of center hull 33, generally, center hull 33 will provide at least fifty percent of the overall static buoyant force of the ship and the remaining static buoyant force will be divided equally among outer hulls 34. In the preferred embodiment, center hull 33 provides approximately 80 percent of the overall static buoyant force of the ship and each of outer hulls 34 provides approximately 10 percent of the overall static buoyant force of the ship.

Center hull 33 and outer hulls 34 are longitudinally positioned relative to each other such that leading edge 36 of each of outer hulls 34 is approximately 50 percent of the center hull length aft of the leading edge 36 of center hull 33. In the preferred embodiment of the present invention, leading edge 36 of each of outer hulls 34 is between 28 percent and 67 percent of the center hull length aft of leading edge 36 of center hull 33, by properly locating outer hulls 34 relative to center hull 33, favorable wave interference between the wave systems of center hull 33 and outer hulls 34 occurs such that the wavemaking resistance is minimized.

The proper longitudinal placement of outer hulls 34 in relationship to center hull 33 (setback) depends on the ship design speed and is generally fixed. However, in certain applications it may be advantageous to minimize wavemaking resistance over a range of ship speeds by moving the outer hulls 34 along tracks thus varying setback with speed. Thus, the present invention may include means to movably mount outer hulls 34 to above-the-water cross structure 40 whereby outer hulls 34 are movable in the longitudinal direction such that resistance due to wave interaction between center hull 33 and outer hulls 34 can be minimized for a given range of ship speeds. The means to movably mount said outer hulls to said cross structure may comprise a track rail system connecting cross structure 40 to outer hulls 34 and motor power means to move outer hulls 34 along the track rail system. The proper longitudinal positioning may be set manually for desired speeds or by way of a feedback system to automatically vary position with ship speed. The present invention may be propelled by any conventional power plant and water propulsion means, e.g., a propeller or water jet. The main propulsion power plant may be located within the submerged portion of center hull 33. This will aid in lowering the overall ship center of gravity. Maneuvering planes, such as fins and rudders, may be installed on any or all of surface-piercing slender hulls 32 for providing directional control and enhancing stability.

Figure 5:
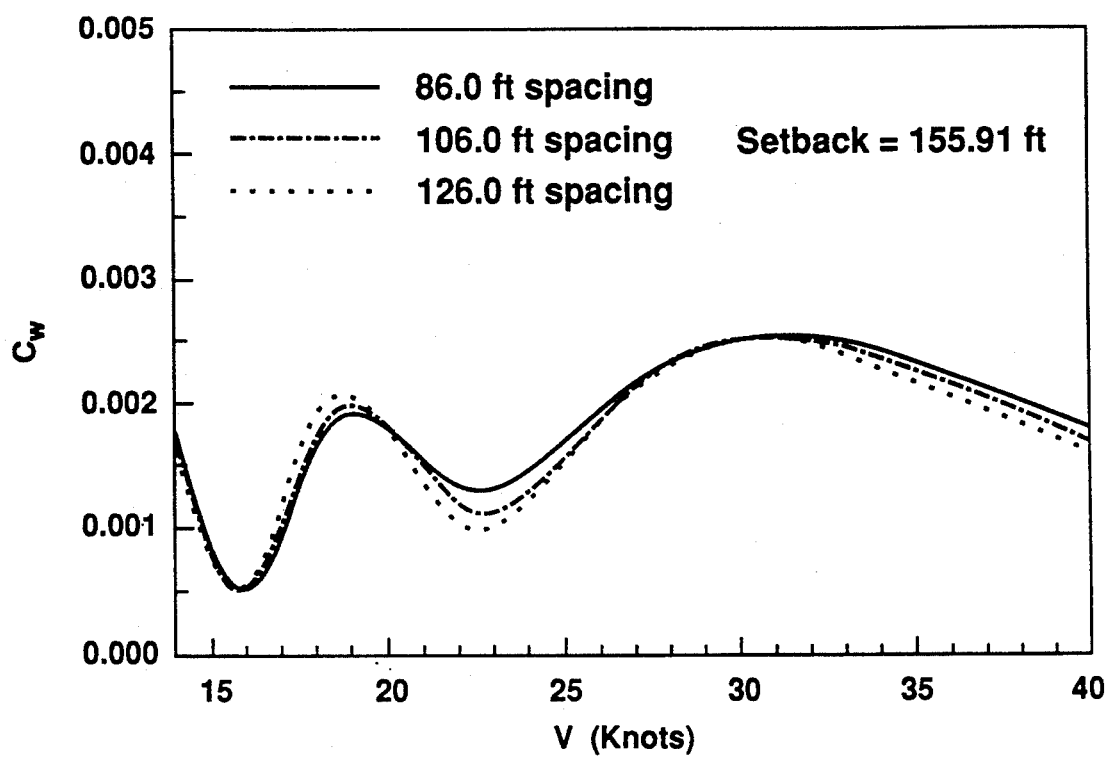
FIG. 5 is a graphical representation of the effects of outer s hull spacing on wavemaking resistance (presented as dimensionless resistance coefficients) for a modified O'Neill Hullform.
Figure 6:
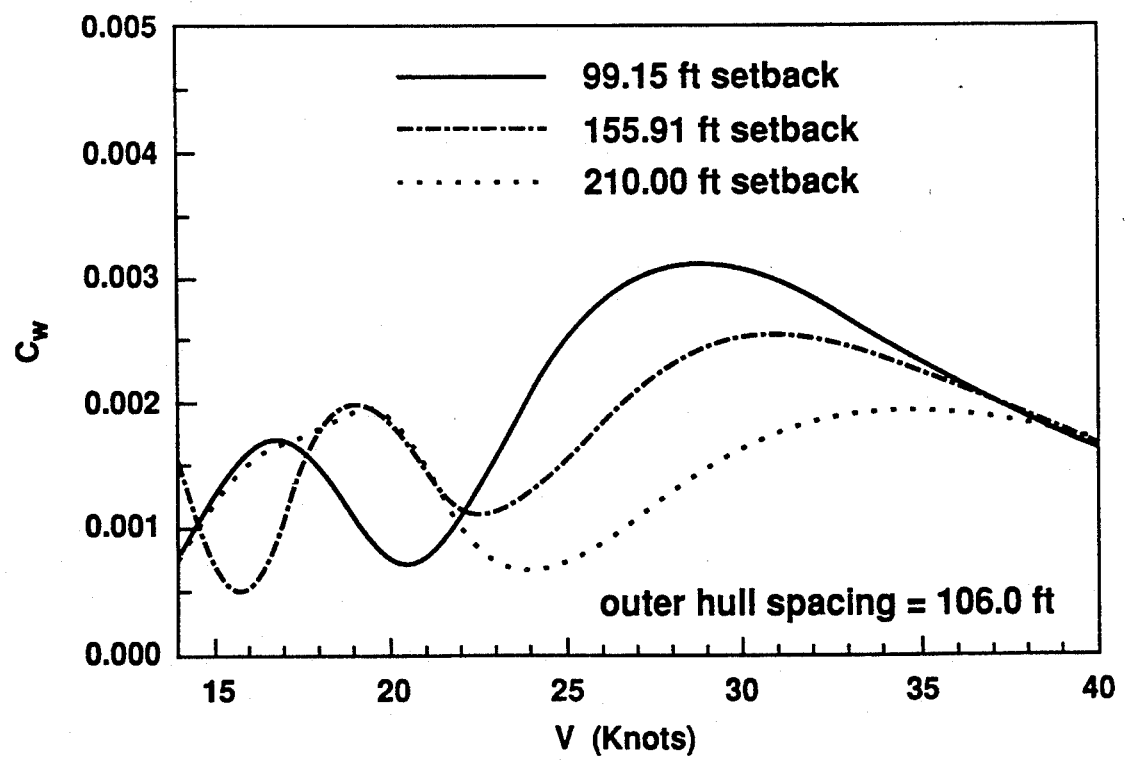
FIG. 6 is a graphical representation of the effects of outer hull setback distance on wavemaking resistance (presented as dimensionless resistance coefficients) for a modified O'Neill Hullform.

Referring now to FIGS. 5 and 6, both the setback and the outer hull spacing influence the resistance of a multihull ship. As indicated by FIG. 5 the outer hull spacing has a small effect on the wavemaking resistance at low ship speeds. However, the outer hull spacing has only a negligible effect on wavemaking resistance at high ship speeds when the spacing is sufficiently large, for example, when the ratio of the outer hull spacing-to-center hull/body length is larger than 0.25. on the other hand, FIG. 6 indicates that the setback distance of the outer hulls has a large influence on the wavemaking resistance of a multihull ship. Based on experiments conducted by the inventor on the WCM and a modified OHF, at ship speeds above 22 knots, the wavemaking resistance is reduced dramatically by increasing the setback.

Figure 7:
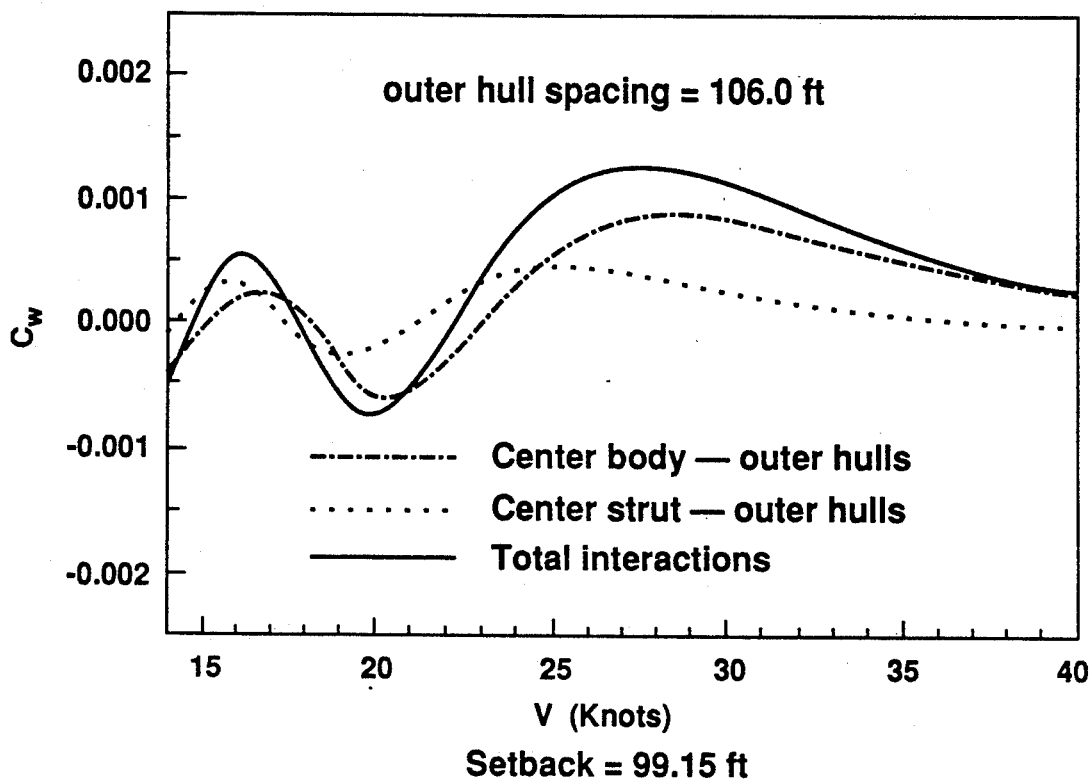
FIG. 7 is a graphical representation of the components of hull interaction wavemaking resistance (presented as dimensionless resistance coefficients) for a modified O'Neill Hullform at an outer hull setback of 99.15 ft.
Figure 8:
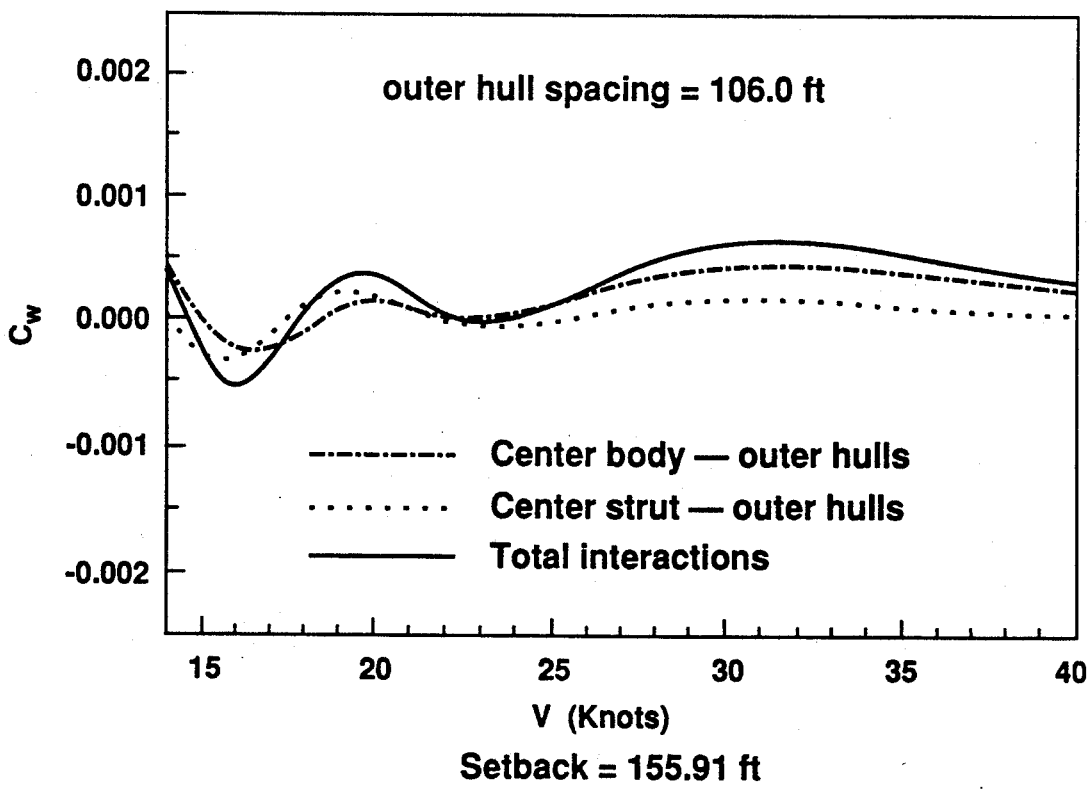
FIG. 8 is a graphical representation of the components of hull interaction wavemaking resistance (presented as dimensionless resistance coefficients) for a modified O'Neill Hullform at an outer hull setback of 155.91 ft.
Figure 9:
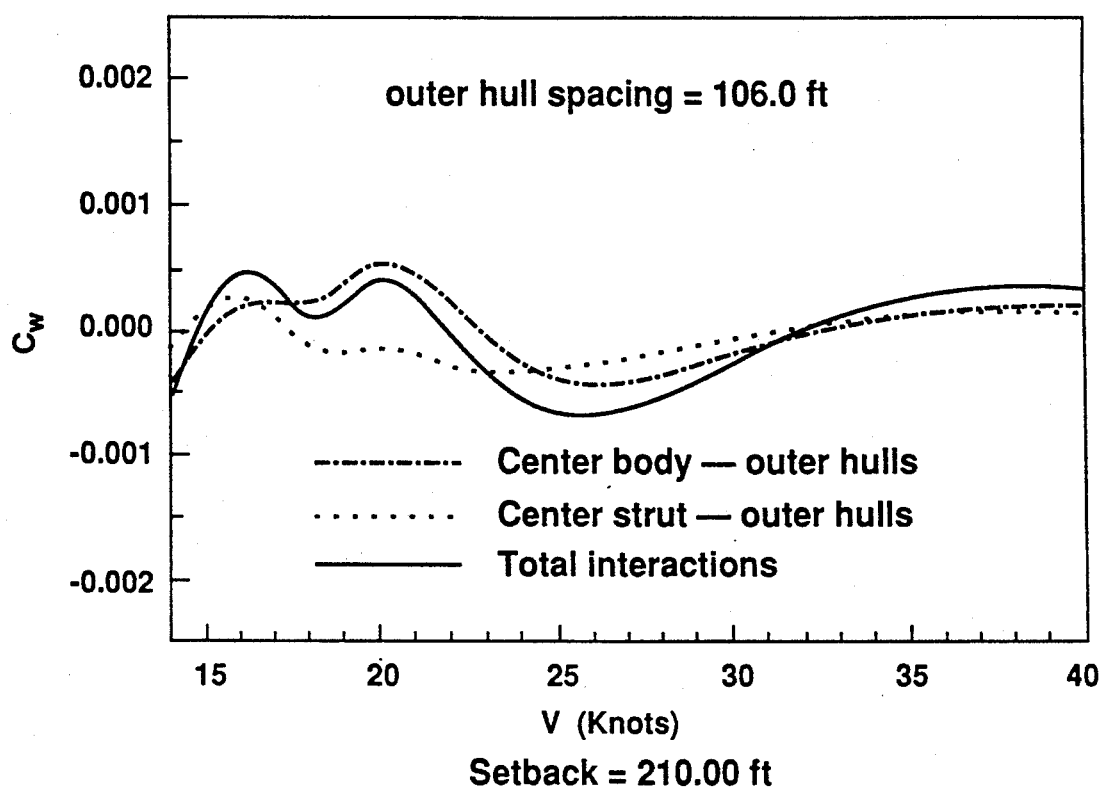
FIG. 9 is a graphical representation of the components of hull interaction wavemaking resistance (presented as dimensionless resistance coefficients) for a modified O'Neill Hullform at an outer hull setback of 210.00 ft.

As shown in FIGS. 7, 8, and 9, graphical representations of components of the interaction wavemaking resistance for a modified OHF at setbacks of 99.15 ft, 155.91 ft, and 210.00 ft (corresponding to setback-to-center body length ratios of 0.28, 0.44, and 0.59), respectively, certain interaction wavemaking resistance components oscillate through negative values in specific speed ranges. Total wavemaking resistance is, of course, always a positive definite quantity. Negative interaction wavemaking resistance pertains to only a part of the total wavemaking resistance. However, it is possible to provide a physical explanation for negative interaction wavemaking resistance.

Since wavemaking resistance is a form of pressure drag, it is the result of integration over the hull of the local pressure force vector component in the longitudinal direction. Interaction wavemaking resistance arises from the wave pattern created by one hull interfering with the waves of a neighboring hull. If the hulls are arranged so that the trough of one hull's wave system occurs in the vicinity of the crest of the wave system generated by the neighboring hull, it is possible to create a situation where the net wave system, due to the interference, is a small net wave crest. Alternatively, the net wave system could feature a trough near the bow and a large wave crest near the stern of the affected hull. If the interfering wave systems are the only wave system components considered, a wave induced thrust or negative pressure drag can be produced.

The Wave Cancellation Multihull (WCM) ship and method for minimizing the wavemaking resistance of multihull vessels is aimed at taking advantage of the special wave interference situations where negative interaction resistance occurs. By selectively fixing the setback distance of the outer hulls based on ship length and design speed, a favorable wave interference can be produced. Alternatively, by movably mounting the outer hulls, favorable wave interference can be produced over a selected speed range. Thus, the wave cancellation Multihull ship configuration offers a wide array of possibilities for reducing the wavemaking resistance component of total ship drag by exploiting arrangement of hull elements favoring wave cancellation.

The method for minimizing the resistance of multihull vessels in accordance with the present invention includes the steps of: providing buoyancy by means of a small waterplane area central hull and at least two identical small waterplane area outer hulls disposed symmetrically on opposite sides of the central hull wherein at least 50 percent of the static buoyant force is provided by the slender, tapered vertical cross sectional underwater shape of the central hull and wherein the remaining static buoyant force is provided by the slender, tapered vertical cross sectional underwater shape of the outer hulls; transversely aligning the central hull and the outer hulls in substantially parallel, rigid, transversely spaced alignment wherein the distance between the centerlines of the outer hulls is equal to at least 20 percent of the length of the central hull; and longitudinally positioning the central hull and the outer hulls relative to each other wherein the leading edge of each of the outer hulls is aft of the leading edge of the central hull whereby favorable wave interference between the wave systems of the central hull and the outer hulls occurs such that the wavemaking resistance is minimized. In the preferred embodiment, the longitudinal positioning of the leading edge of each of the outer hulls is between 28 percent and 67 percent of the central hull length aft of the leading edge of the central hull.

The method of the present invention may include positioning a plurality of central hull plus outer hull combinations together either in parallel or in series. Thus for example, the present method may provide for a center hull and four laterally spaced outer hulls or, alternatively, a center hull with two forward outer hulls and two aft outer hulls. The method of the present invention may further include longitudinally moving the outer hulls relative to the central hull wherein the relative positioning of the central hull and the outer hulls varies with ship speed whereby resistance due to wave interaction between the central hull and the outer hulls is minimized for a given range of ship speeds.

The relative positioning of multiple hulls, in accordance with the present invention, may be used with multiple hulls that do not incorporate the tapered hull shape of the present invention. Furthermore, the tapered hull shape of the present invention may be used with multiple hull designs that do not incorporate the relative positioning of hulls of the present invention.

Figure 10:
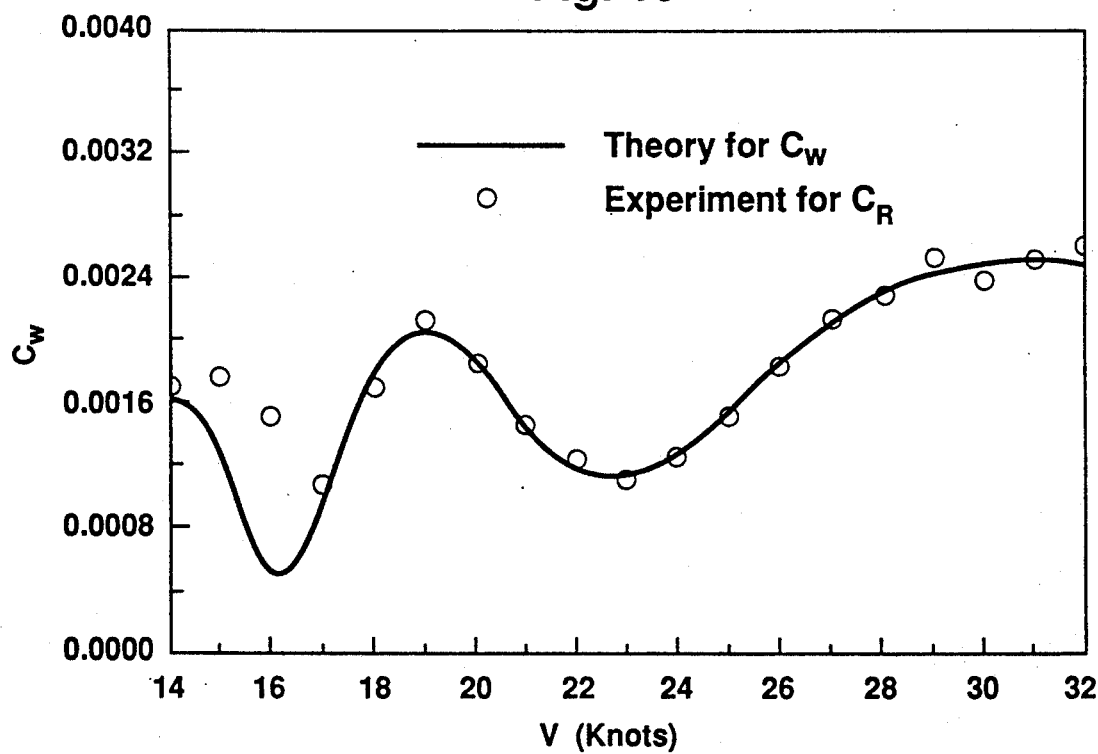
FIG. 10 is an exemplary graphical comparisons of the theoretically predicted wavemaking resistance and the experimentally determined residuary resistance (presented as dimensionless resistance coefficients) for a modified O'Neill Hullform.
Figure 11:
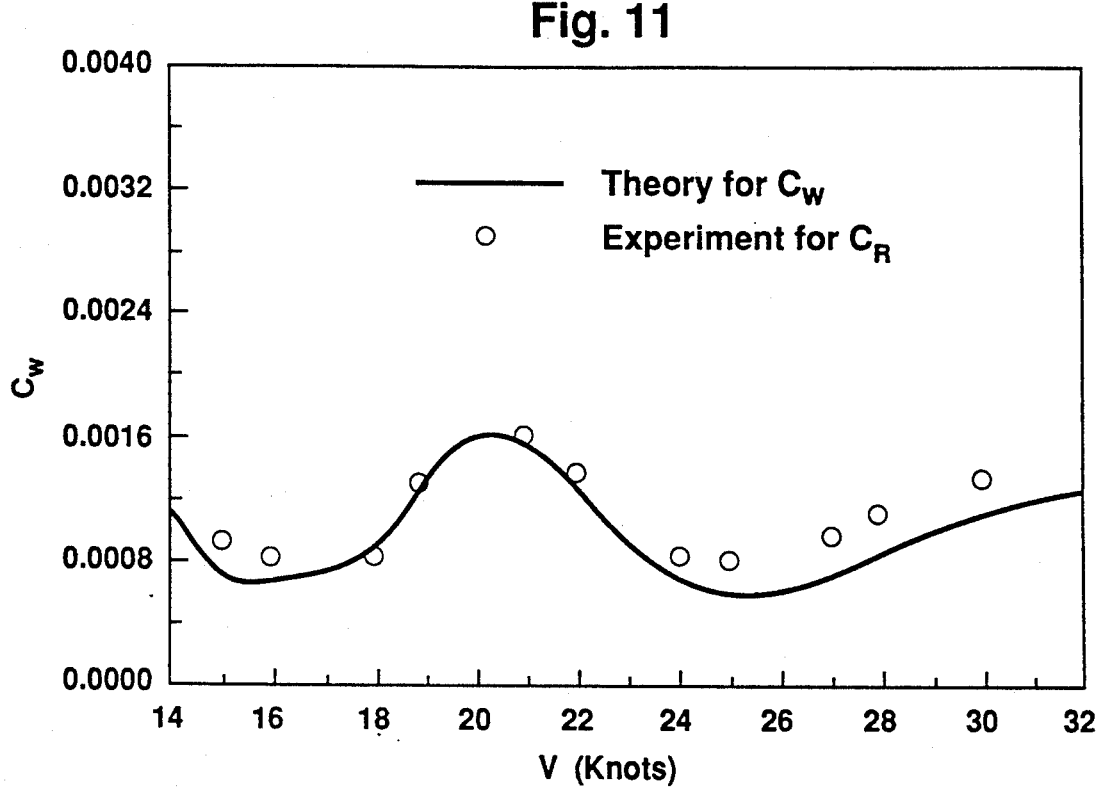
FIG. 11 is an exemplary graphical comparisons of the theoretically predicted wavemaking resistance and the experimentally determined residuary resistance (presented as dimensionless resistance coefficients) for the wave Cancellation Ship of the present invention.

Alternative embodiments of the Wave Cancellation Multihull ship (WCM) of the present invention have been studied experimentally and analytically. The wavemaking resistance coefficients of the OHF and the WCM ship of the present invention have been computed and compared to experimental results. FIGS. 10 and 11 are exemplary graphical comparisons of the theoretically predicted wavemaking resistance and the experimentally determined residuary resistance (presented as dimensionless resistance coefficients) for the OHF and the WCM ship, respectively. Residuary resistance is composed of components of wavemaking resistance and viscous pressure resistance (also referred to as form drag). The form drag contribution to residuary resistance is quite small for slender hulls such as the hulls of the OHF and the present invention. Consequently, residuary resistance of slender hulls can be assumed to consist primarily of wavemaking resistance. Therefore, as shown by FIGS. 10 and 11, the theoretically and experimentally determined resistance coefficients show good agreement.

A systematic analytic study of the present invention has been performed. The dimensions of the various embodiments of the WCM compared to the OHF are presented in TABLE 1. The waterplane area, displacement, and outer hull geometry and spacing of the specific WCM ship embodiments are essentially identical to the OHF. In accordance with the present invention, the center body-center strut system and outer hull setback distances of the OHF are replaced by the tapered center hull and increased setback of the WCM ship design. The wavemaking resistance performance of the improved tri-hull design provided by the WCM ship has been studied in detail by the inventor and has been compared with the OHF. The components of wavemaking resistance due to the outer hulls of the OHF and the WCM ship are essentially the same. However, components of wavemaking resistance due to the center hull and center hull-outer hull interactions for the WCM ship generally differ from those of the original OHF.

EXAMPLE 1

(WCM-1)

Figure 12:
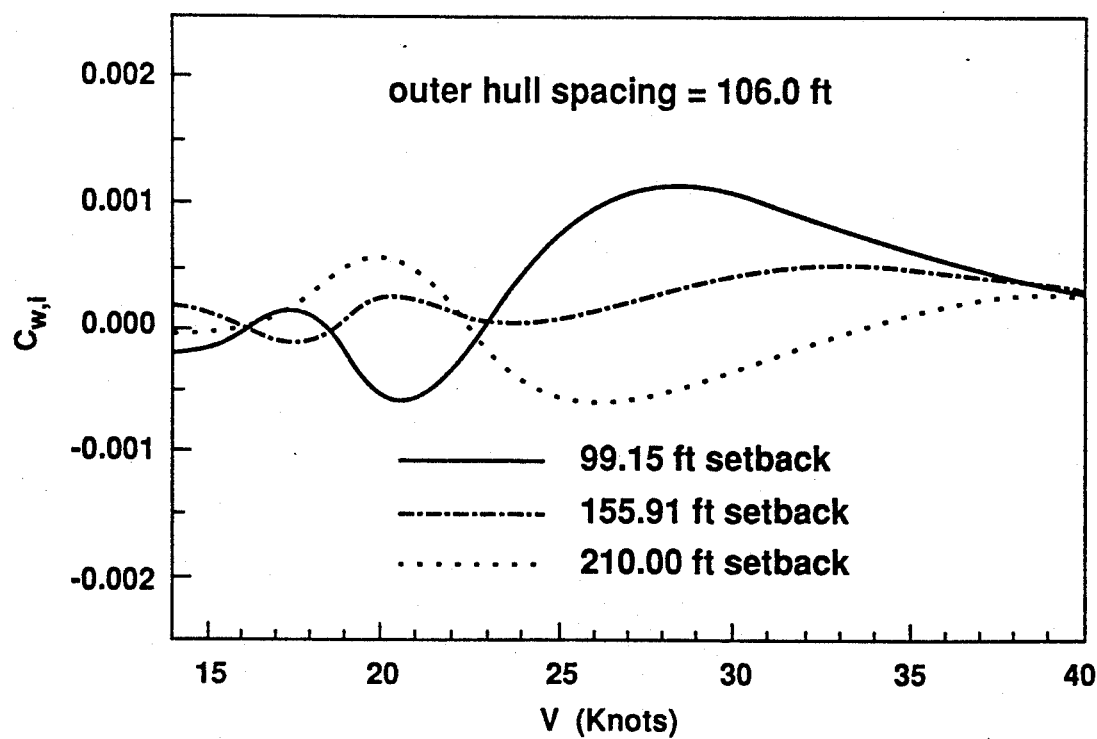
FIG. 12 is a graphical representation of the effects of outer hull setback distance on interaction wavemaking resistance (presented as dimensionless resistance coefficients) for one embodiment of the Wave cancellation Ship (WCM-1) of the present invention.
Figure 13:
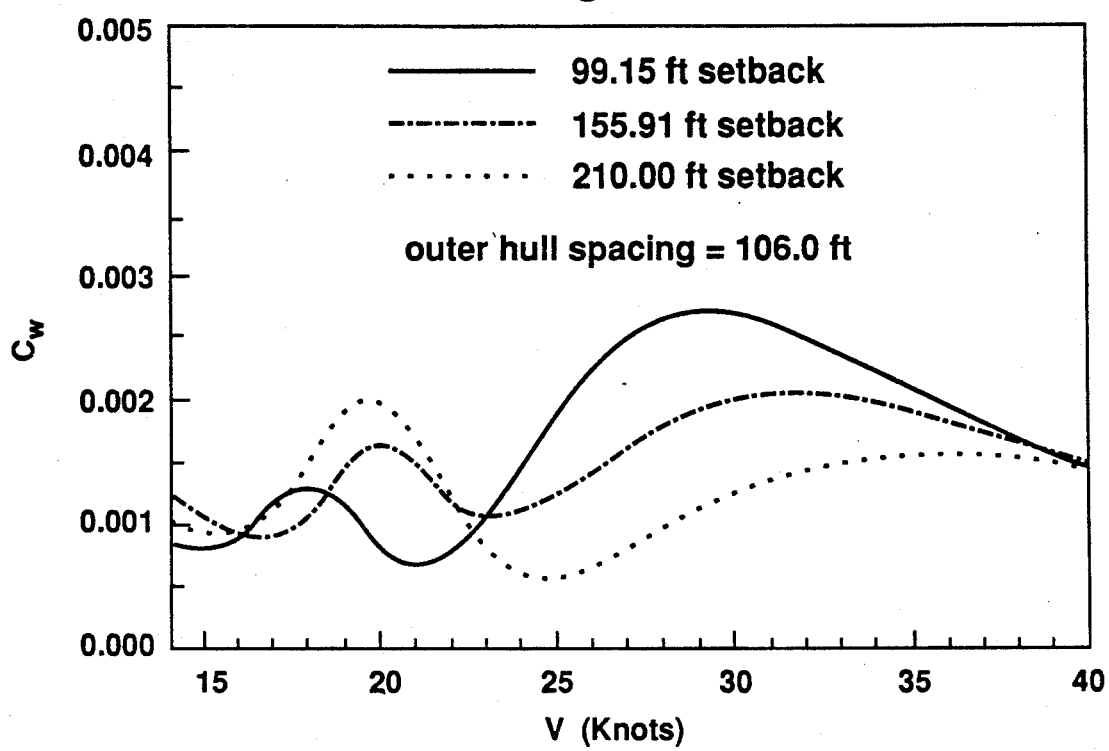
FIG. 13 is a graphical representation of the effects of outer hull setback distance on total wavemaking resistance (presented as dimensionless resistance coefficients) for one embodiment of the Wave cancellation Ship (WCM-1) of the present invention.
Figure 14:
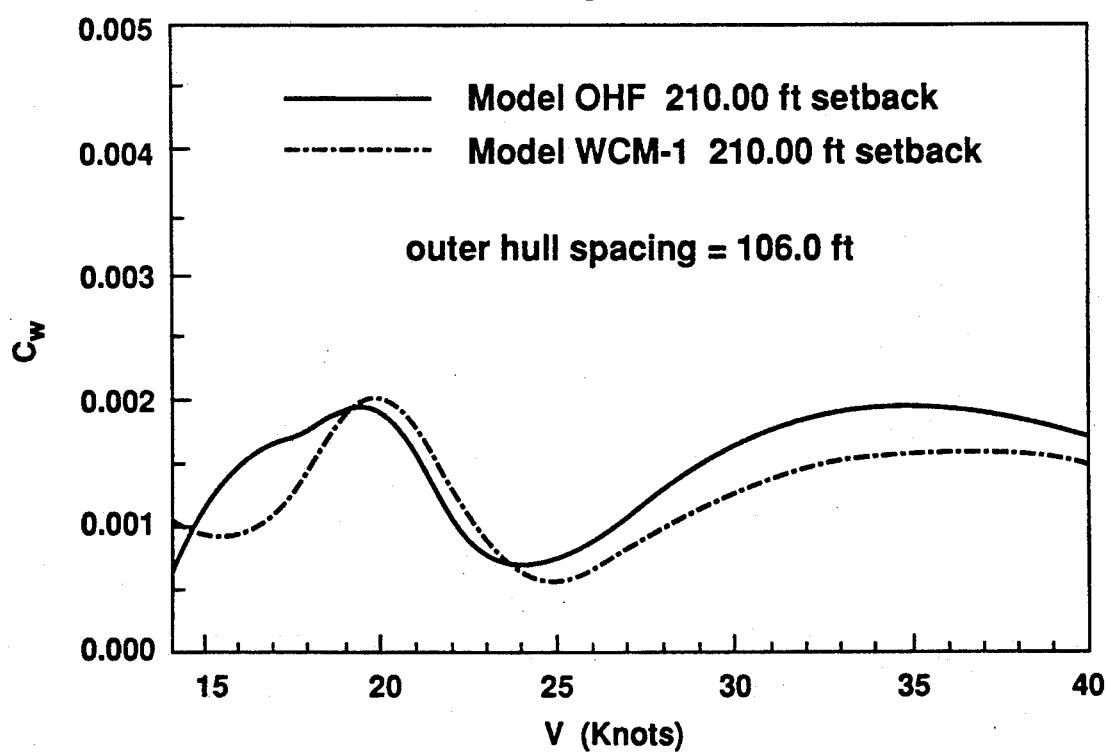
FIG. 14 is a graphical comparison of total wavemaking resistance presented as dimensionless resistance coefficients) for the O'Neill Hullform and one embodiment of the Wave cancellation ship (WCM-1) of the present invention.

Results for the first embodiment of the wave cancellation Multihull Ship (WCM-1) are presented in FIGS. 12, 13, and 14. WCM-1 is described by equation (1) with:

| | | | | | |
|---|---|---|---|---|---|
| $A1 = 139.00$ | $B1 = 217.00$ | $C1 = 354.99$ | $T1 = 9.52$ | $D1 = 30.00$ | $\lambda = 0.040$ |
| $A2 = 31.35$ | $B2 = 148.85$ | $C2 = 190.00$ | $T2 = 6.60$ | $D2 = 13.88$ | $\lambda = 0.000$ |
| $A3 = 31.35$ | $B3 = 148.85$ | $C3 = 190.00$ | $T2 = 6.60$ | $D3 = 13.88$ | $\lambda = 0.000$ |

FIG. 12 is a graphical representation of the effects of outer hull setback distance on interaction wavemaking resistance (presented as dimensionless resistance coefficients) for WCM-1. FIG. 13 is a graphical representation of the effects of outer hull setback distance on total wavemaking resistance (presented as dimensionless resistance coefficients) for WCM-1. Although both WCM-1 and the OHF have equivalent center hull and center body lengths, respectively, and have identical displacements, the wavemaking resistance components due to the center hull and the center hull-outer hull interactions of the WCM-1 are considerably lower that for the OHF. As shown in FIG. 14, for identicals setback of 210 ft, the wavemaking resistance of the WCM-1 in the high speed range (above 24 knots) is 30 percent lower than that of the OHF.

EXAMPLE 2

(WCM-2)

Figure 15:
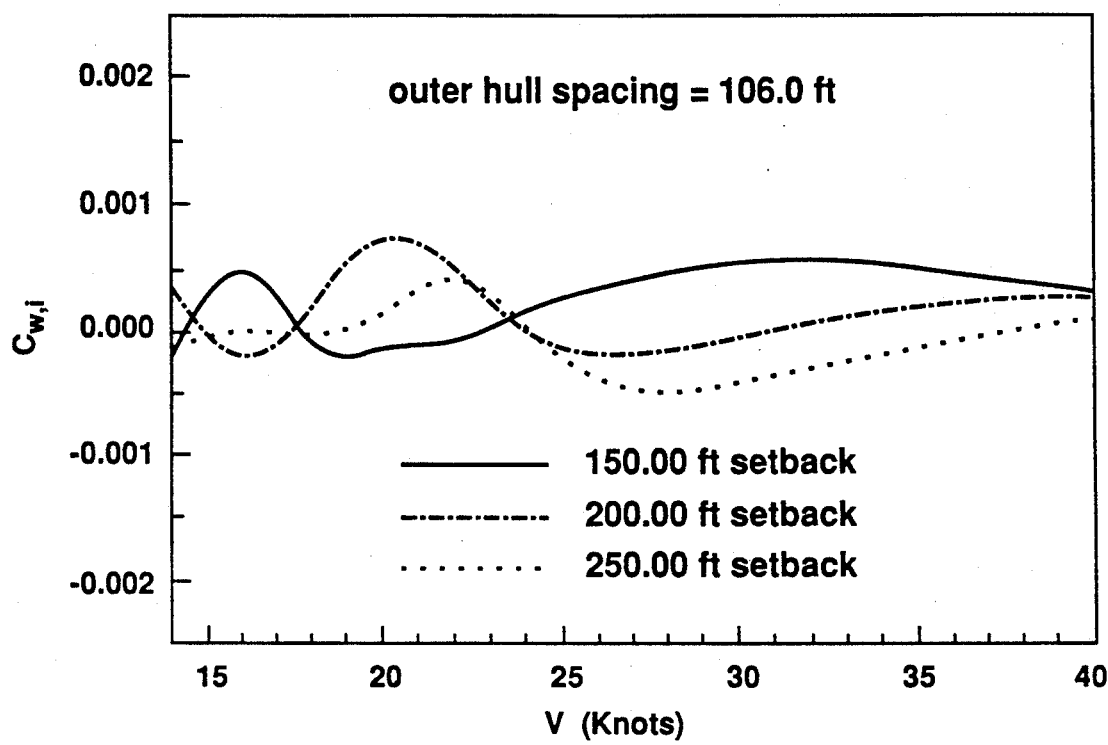
FIG. 15 is a graphical representation of the effects of outer hull setback distance on interaction wavemaking resistance (presented as dimensionless resistance coefficients) for an alternative embodiment of the wave cancellation Ship (WCM-2) of the present invention.
Figure 16:
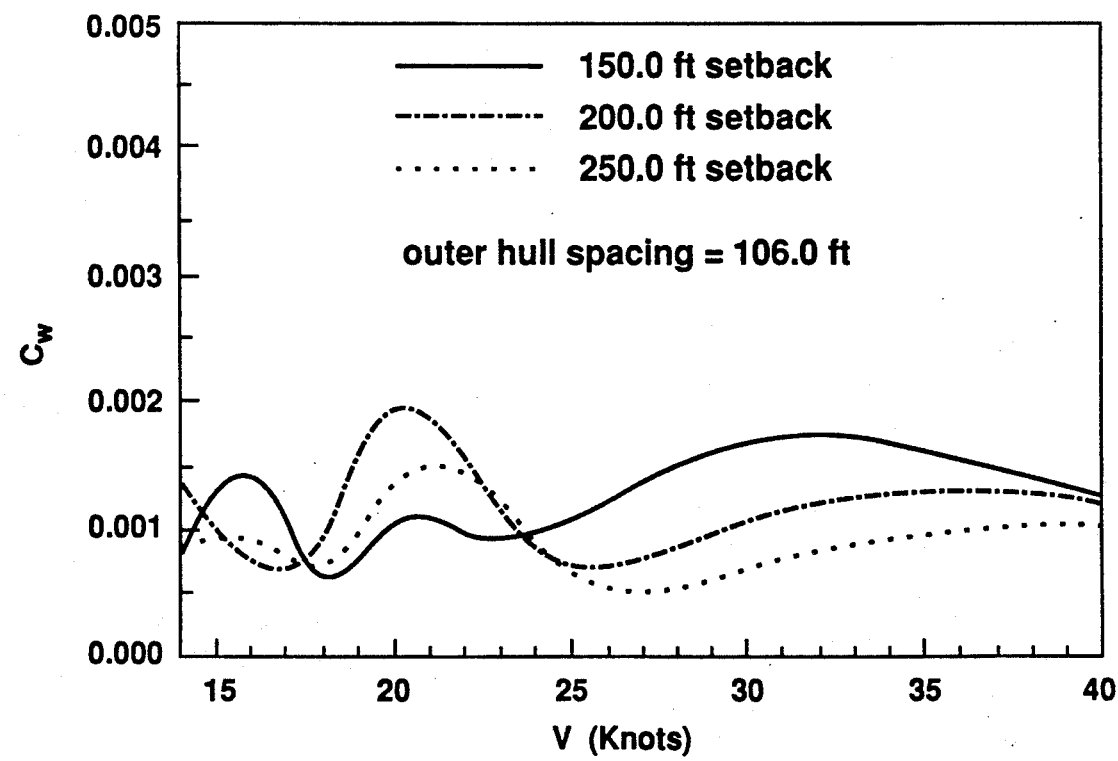
FIG. 16 is a graphical representation of the effects of outer hull setback distance on total wavemaking resistance (presented as dimensionless resistance coefficients) for an alternative embodiment of the Wave Cancellation ship (WCM-2) of the present invention.
Figure 17:
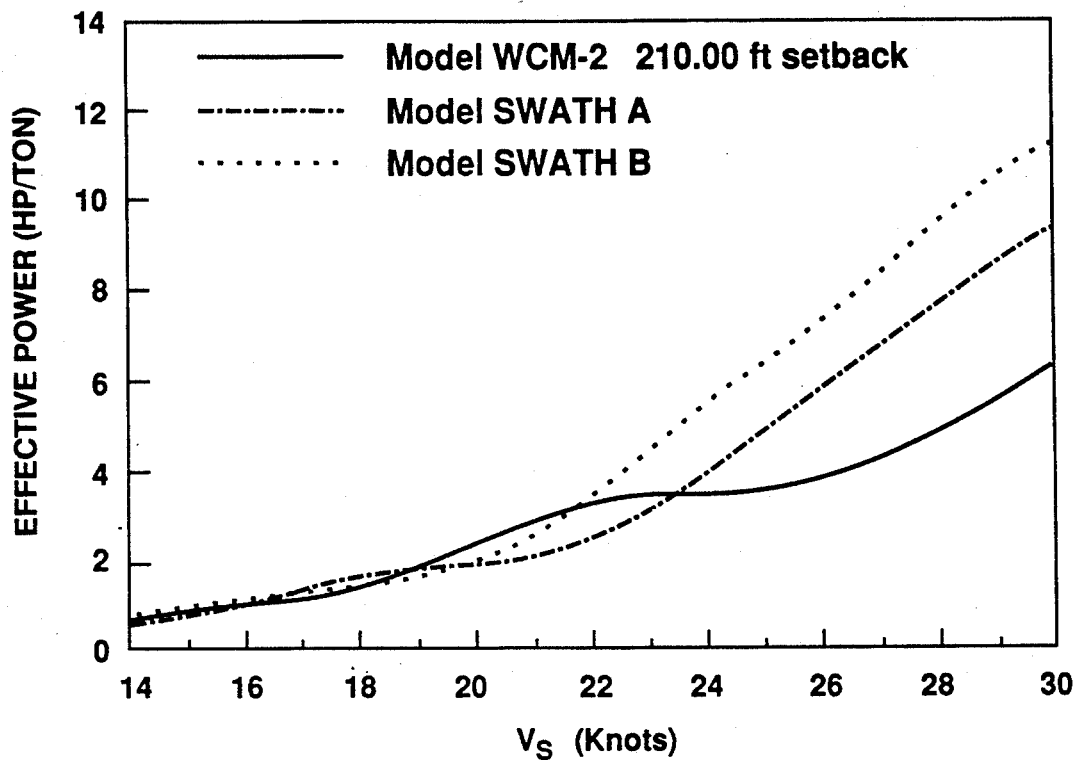
FIG. 17 is a graphical comparison of the total ship resistance (presented as Effective Horsepower per ton displacement) for two SWATH ship designs and an alternative embodiment of the Wave cancellation ship (WCM-2) of the present invention.

Results for the second embodiment of the Wave Cancellation Multihull Ship (WCM-2) are presented in FIGS. 15, 16, and 17. WCM-2 is described by equation (1) with:

| | | | | | |
|---|---|---|---|---|---|
| $A1 = 143.00$ | $B1 = 231.00$ | $C1 = 390.00$ | $T1 = 8.65$ | $D1 = 30.00$ | $\lambda = 0.040$ |
| $A2 = 31.35$ | $B2 = 148.85$ | $C2 = 190.00$ | $T2 = 6.60$ | $D2 = 13.88$ | $\lambda = 0.000$ |
| $A3 = 31.35$ | $B3 = 148.85$ | $C3 = 190.00$ | $T2 = 6.60$ | $D3 = 13.88$ | $\lambda = 0.000$ |

WCM-2, which has a narrower center hull than WCM-1 or the OHF, with a slenderness ratio (ratio of center hull maximum width-to-center hull length) of 0.049, has correspondingly lower center hull wavemaking resistance. In order to maintain a waterplane area equal to the OHF, the slenderer center hull of WCM-2 is correspondingly longer. The longer center hull can accommodate a larger setback. As indicated in FIG. 15, a larger setback can enhance favorable wavemaking interaction between the center and outer hulls. As indicated in FIG. 16, increasing setback produces distinctive reductions in wavemaking resistance at higher speeds.

The high speed wavemaking of multihull ships, such as the OHF, can be greatly reduced by tapering the cross sectional shape of the hulls and by increasing the setback of the outer hulls. The length of the center hull and, consequently, the amount of setback possible will be determined by ship structural considerations and practical arrangements. However, the present invention will provide considerable resistance improvement even with a moderate setback distance. As indicated in FIG. 17, the resistance of WCM-2, with a moderate setback of 210 ft (presented as effective horsepower-per-ton displacement), is compared with that of two SWATH ships designed by the Navy. The displacements of SWATH A and SWATH B are 4300 and 3800 long tons, respectively. Above ship speeds of 23 knots, the effective power for WCM-2 is less than for either SWATH design. At a ship speed of 30 knots, the decrease in effective power-per-ton displacement for WCM-2 ranges from 33 to 44 percent compared to the two SWATH designs studied.

EXAMPLE 3

(WCM-3)

Figure 18:
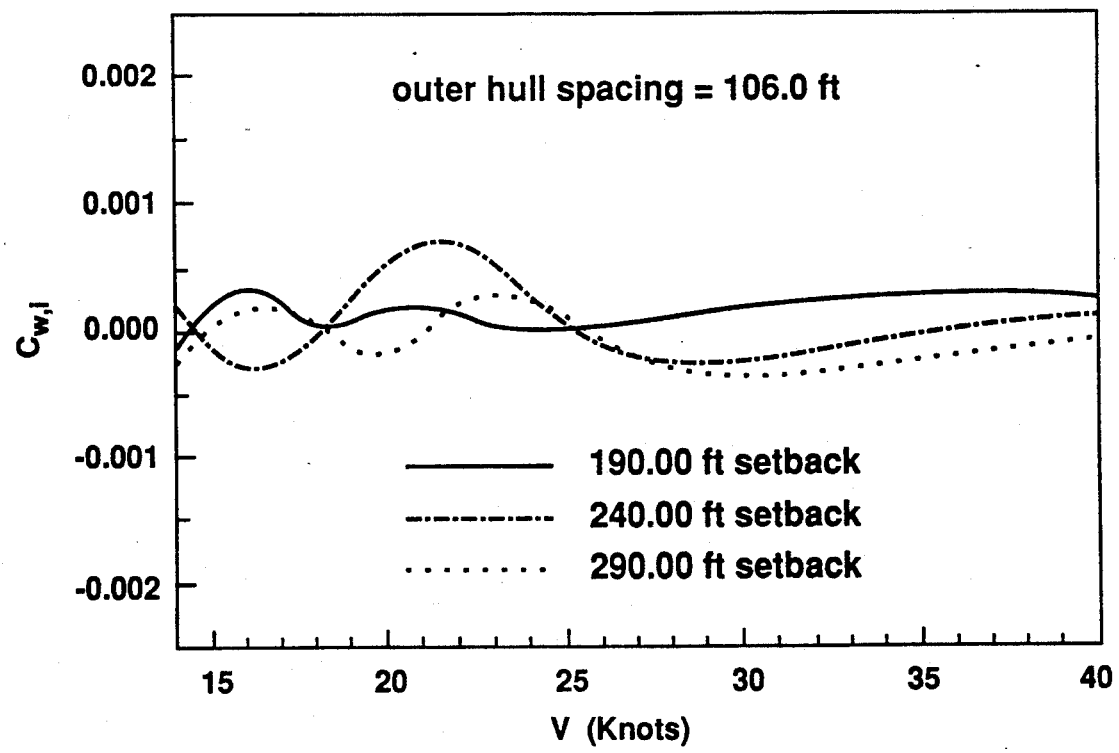
FIG. 18 is a graphical representation of the effects of outer hull setback distance on interaction wavemaking resistance (presented as dimensionless resistance coefficients) for a second alternative embodiment of the Wave Cancellation Ship (WCM-3) of the present invention.
Figure 19:
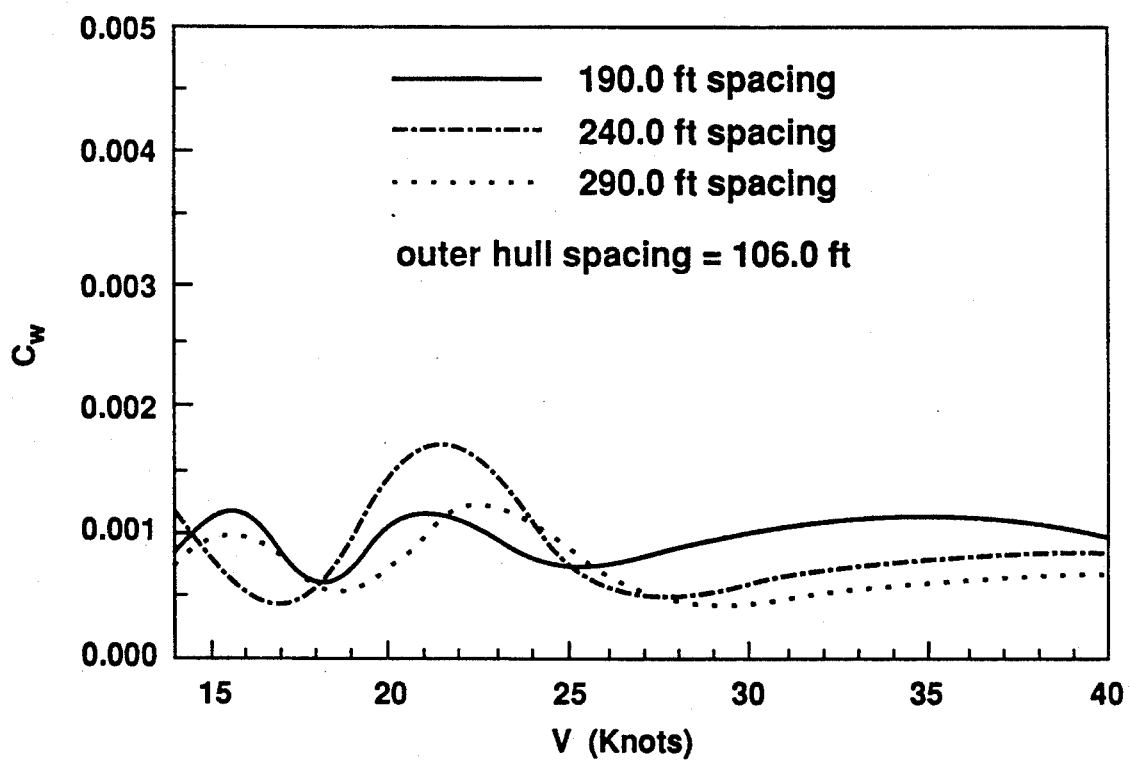
FIG. 19 is a graphical representation of the effects of outer hull setback distance on total wavemaking resistance (presented as dimensionless resistance coefficients) for a second alternative embodiment of the wave cancellation ship (WCM-3) of the present invention.

Results for the third embodiment of the Wave Cancellation Multihull Ship (WCM-3) are presented in FIGS. 18 and 19. WCM-3 is described by equation (1) with:

| | | | | | |
|---|---|---|---|---|---|
| A1 = 158.00 | B1 = 258.00 | C1 = 430.00 | T1 = 7.85 | D1 = 30.00 | $\lambda$ = 0.040 |
| A2 = 31.35 | B2 = 148.85 | C2 = 190.00 | T2 = 6.60 | D2 = 13.88 | $\lambda$ = 0.000 |
| A3 = 31.35 | B3 = 148.85 | C3 = 190.00 | T2 = 6.60 | D3 = 13.88 | $\lambda$ = 0.000 |

WCM-3 has an even narrower, and longer, center hull than WCM-2, with a slenderness ratio of 0.040. FIG. 18 is a graphical representation of the effects of outer hull setback distance on interaction wavemaking resistance (presented as dimensionless resistance coefficients) for WCM-3. FIG. 19 is a graphical representation of the effects of outer hull setback distance on total wavemaking resistance (presented as dimensionless resistance coefficients) for WCM-3. The variations of the components of wavemaking resistance are quantitatively similar to WCM-2. However, attenuations in the total wavemaking resistance and the center hull wavemaking resistance are even more pronounced.

TABLE 1

SHIP DIMENSIONS FOR OHF AND VARIOUS WCM SHIP EMBODIMENTS

| | OHF | WCM-1 | WCM-2 | WCM-3 |
|---|---|---|---|---|
| Center Body Length (ft) | 354.99 | — | — | — |
| Center Strut Length (ft) | 280.05 | — | — | — |
| Center Body Max Width (ft) | 21.45 | — | — | — |
| Center Strut Max Width (ft) | 9.84 | — | — | — |
| Center Hull Length (ft) | — | 354.99 | 390.00 | 430.00 |
| Center Hull Max Width (ft) | — | 20.95 | 19.03 | 17.27 |
| Center Hull Waterline Width (ft) | — | 9.52 | 8.65 | 7.85 |
| Center Hull Max Draft (ft) | 31.80 | 30.00 | 30.00 | 30.00 |
| Outer Hull Length (ft) | 190.00 | 190.00 | 190.00 | 190.00 |
| Outer Hull Max Width (ft) | 6.60 | 6.60 | 6.60 | 6.60 |
| Outer Hull Max Draft (ft) | 13.88 | 13.88 | 13.88 | 13.88 |
| Outer Hull Spacing (ft) | 106.00 | 106.00 | 106.00 | 106.00 |
| Setback A (ft) | 99.15 | 99.15 | 150.00 | 190.00 |
| Setback B (ft) | 155.91 | 155.91 | 200.00 | 240.00 |
| Setback C (ft) | 210.00 | 210.00 | 250.00 | 290.00 |
| Total Wetter Surface (ft*2) | 37405. | 39818. | 41885. | 44286. |
| Total Displacement (lt) | 4300. | 4300. | 4300. | 4300. |
| Spacing/Center Hull Length | 0.30 | 0.30 | 0.27 | 0.25 |
| Spacing/Outer Hull Length | 0.56 | 0.56 | 0.56 | 0.56 |
| Hull Length Ratio (Outer/Center) | 0.54 | 0.54 | 0.49 | 0.44 |
| Setback A/Center Hull Length | 0.28 | 0.28 | 0.39 | 0.44 |
| Setback B/Center Hull Length | 0.44 | 0.44 | 0.51 | 0.56 |
| Setback C/Center Hull Length | 0.59 | 0.59 | 0.64 | 0.67 |
| Center Hull Slenderness Ratio | 0.060 | 0.059 | 0.049 | 0.040 |
| Outer Hull Slenderness Ratio | 0.035 | 0.035 | 0.035 | 0.035 |

The above examples are based on analytical and experimental studies of the OHF and the present invention at identical displacements of 4300 long tons wherein the buoyant force ratio of center-to-outer hulls is 8 to 2, identical outer hull spacing of 106.0 ft. and wherein the outer hull geometry of the WCM is identical to the outer hulls of the original OHF design. However, further resistance reductions are possible when the present invention incorporates the tapered design of the WCM center hull into the design of the outer hulls. Furthermore, the present invention is applicable to ships of larger or smaller displacements and differing buoyant force ratios. The preferred outer-hull-to-center-hull buoyant force ratio is greater than 0.50 with the center hull providing at least 50 percent of the buoyancy and each outer hull providing 25 percent of the total ship buoyancy or less. Ship designs may be limited by the ship draft. For a center-hull-to-outer-hull buoyant force ratio of 8 to 2, maximum ship draft is 37 ft and 56 ft for ship displacements of 10,000 and 34,000 long tons, respectively. The present invention is applicable to different outer hull spacings, however, for optimum wave interference effects, the ratio of outer-hull-spacing-to-center-hull-length should be greater than 0.20.

Resistance performance of multihull ships depends largely on hull element arrangements and, to a lesser degree on the hull shape. Therefore, the best arrangement for a particular case will vary with ship displacements and speed of operation. At high cruise speeds the projected reduction in wavemaking resistance for the tri-hull configuration of the present invention promises marked improvements in total effective power compared to SWATH ships of the same displacement, despite an increased wetted surface area. Based on effective horsepower per ton of ship displacement, the total resistance of the tri-hull WCM ship is comparable to a monohull ship in the speed range of 30 knots. Consequently, the seakeeping benefits of small waterplane ships can be achieved without the resistance penalty that afflicts SWATH ship designs at high speeds.

The advantages of the present invention are numerous.

The wave Cancellation Multihull ship maintains the seakeeping benefits of small waterplane area multihull vessels without the resistance penalties experienced by prior designs.

The lower resistance provided by the present invention translates into reduced powering requirements and thus lower fuel consumption.

The present invention provides for a greater range for the same on board fuel capacity.

Additionally, the present invention provides a design with increased deck area.

The present invention provides for unique flexibility for loading, storing, and unloading cargo.

The wave cancellation Multihull ship promises an advantageous ship configuration for oceanographic ships, survey ships, sealift ships, ferries, cruise ships, and surface combatants.

The present invention is, furthermore, highly applicable to any ship application requiring high speed, low fuel consumption, and good seakeeping in calm and rough seas.

The present invention and many of its attendant advantages will be understood from the foregoing description and it will he apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

What is claimed is:

1. A wave cancellation multihull ship, comprising:
    at least three surface-piercing slender hulls, each of said hulls having a leading edge, a trailing edge and a slender element extending between said leading and trailing edges for providing buoyancy;
    said surface-piercing slender hulls have slender, tapered vertical cross sectional underwater shapes wherein no sharp discontinuities are present in the underwater shape of said hulls and further wherein each of said hulls has small waterplane areas;
    an above-the-water cross structure rigidly connected to said surface-piercing slender hulls wherein said hulls are held in substantially parallel, transversely spaced alignment and further wherein said hulls are located in a synnetric arrangement about a longitudinal centerline; and
    at least one of said surface-piercing slender hulls being longitudinally positioned relative to the remaining hulls such that the leading edge of said hull is forward of the leading edge of the remaining hulls whereby favorable wave interference between the wave systems of said forward hull and the remaining hulls occurs resulting in the wave-making resistance being minimized.

2. A wave cancellation multihull ship as in claim 1, wherein the minimum underwater waterplane area of each of said surface-piercing slender hulls is located approximately at the waterline and wherein the maximum underwater width of each of said surface-piercing slender hulls is located substantially at the maximum draft of each of said hulls and is between 3 percent and 10 percent of the length of each of said hulls.

3. A wave cancellation multihull ship as in claim 1, wherein at least one of said surface-piercing slender hulls has a deeper draft and a longer length than the remaining hulls and further wherein said deeper, longer hull provides at least fifty percent of the overall static buoyant force of the ship and wherein the remaining static buoyant force is divided equally among the remaining hulls.

4. A wave cancellation multihull ship as in claim 1, wherein the number of surface-piercing slender hulls is three and wherein said hulls comprise a center hull and two identical outer hulls disposed symmetrically on opposite sides of said center hull.

5. A wave cancellation multihull ship as in claim 4, wherein the distance between the centerlines of said outer hulls is equal to at least 20 percent of the length of said center hull.

6. A wave cancellation multihull ship as in claim 4, wherein said center hull has a deeper draft than said outer hulls and said center hull has a length equal to approximately twice the length of said outer hulls and further wherein said center hull provides approximately 80 percent of the overall static buoyant force of the ship and each of said outer hulls provides approximately 10 percent of the overall static buoyant force of the ship 7. A wave cancellation multihull ship as in claim 4, wherein the length of said outer hulls is between 44 percent and 54 percent of the length of said center hull.

8. A wave cancellation multihull ship as in claim 4, wherein the maximum underwater width of each of said surface-piercing slender hulls is located substantially at the maximum draft of each of said hulls and is between 3 percent and 10 percent of the length of each of said hulls.

9. A wave cancellation multihull ship as in claim 4, wherein the leading edge of each of said outer hulls is between 28 percent and 67 percent of the center hull length aft of the leading edge of said center hull.

10. A wave cancellation multihull ship as in claim 4, wherein said center hull and said outer hulls include parabolic nose and tail sections and wherein the underwater shape of said center hull and said outer hulls is defined by the following expression:

| | |
|---|---|
| $F_n(X) = (T_n/2)[1 - \lambda(z)]\{1 - [(A_n - X_n)/A_n]\}$ | for $0 < X_n < A_n$ |
| $F_n(X) = T_n/2[1 - \lambda(z)]$ | for $A_n < X_n < B_n$ |
| $F_n(X) = (T_n/2)[1 - \lambda(z)]\{1 - [(X_n - B_n)/(C_n - B_n)]\}$ | for $B_n < X_n < C_n$ | wherein $C_n$ is the length of said center hull or said outer hulls, $T_n$ is the waterline width of said center hull or said outer hulls, $A_n$ is the parabolic nose section length of said center hull or said outer hulls, $(C_n-B_n)$ is the parabolic tail section length of said center hull or said outer hulls, $\lambda$ is the percent change in width per foot depth of said center hull or said outer hulls, z is depth below the waterline, and wherein subscript n is equal to 1, 2, or 3 and designates the quantities due to said center hull or said outer hulls, respectively.

11. A wave cancellation multihull ship as in claim 4, further comprising:
    means to movably mount said outer hulls to said cross structure whereby said outer hulls are movable in the longitudinal direction such that resistance due to wave interaction between said center hull and said outer hulls can be minimized for a given range of ship speeds.

12. A wave cancellation multihull ship, comprising:

three surface-piercing slender hulls, each of said hulls having a leading edge, a trailing edge and a slender tapered element extending between said leading and trailing edges for providing buoyancy;

an above-the-water cross structure rigidly connected to said surface-piercing slender hulls wherein said hulls are held in substantially parallel, transversely spaced alignment;

said surface-piercing slender hulls comprising a center hull and two identical outer hulls disposed symmetrically on opposite sides of said center hull wherein the distance between the centerlines of said outer hulls being equal to at least 20 percent of the length of said center hull;

said center hull and said outer hulls having slender, tapered vertical cross sectional underwater shapes wherein no sharp discontinuities are present:

said center hull and said outer hulls having small waterplane areas with the minimum underwater waterplane area being located approximately at the waterline and with the maximum underwater waterplane area being located substantially at the maximum draft of each of said hulls;

said center hull having a deeper draft than said outer hulls and said center hull having a length equal to approximately twice the length of said outer hulls and further wherein said center hull provides approximately 80 percent of the overall static buoyant force of the ship and each of said outer hulls provides approximately 10 percent of the overall static buoyant force of the ship;

said center hull having a maximum underwater width equal to approximately 5 percent of the length of said center hull;

said outer hulls having a maximum underwater width equal to approximately 3.5 percent of the length of said outer hulls; and said center hull and said outer hulls being longitudinally positioned relative to each other such that the leading edge of each of said outer hulls is approximately 50 percent of the center hull length aft of the leading edge of said center hull whereby favorable wave interference between the wave systems of said center hull and said outer hulls occurs such that the wavemaking resistance is minimized.

13. A wave cancellation multihull ship as in claim 12, further comprising:

means to movably mount said outer hulls to said cross structure whereby said outer hulls are movable in the longitudinal direction such that resistance due to wave interaction between said center hull and said outer hulls can be minimized for a given range of ship speeds.

14. A method for minimizing the resistance of multihull vessels comprising the steps of:

providing buoyancy by means of a small waterplane area central hull and at least two small waterplane area outer hulls disposed symmetrically on opposite sides of said central hull wherein at least 50 percent of the static buoyant force is provided by the slender, tapered vertical cross sectional underwater shape of said central hull and wherein the remaining static buoyant force is provided by the slender, tapered vertical cross sectional underwater shape of each of said outer hulls;

transversely aligning said central hull and said outer hulls in substantially parallel, rigid, transversely spaced alignment wherein the distance between the centerlines of said outer hulls is equal to at least 20 percent of the length of said central hull; and longitudinally positioning said central hull and said outer hulls relative to each other wherein the leading edge of each of said outer hulls is aft of the leading edge of said central hull whereby favorable wave interference between the wave systems of said central hull and said outer hulls occurs such that the wavemaking resistance is minimized.

15. A method for minimizing the resistance of multihull vessels as in claim 14 wherein the longitudinal positioning of the leading edge of each of said outer hulls is between 28 percent and 67 percent of the central hull length aft of the leading edge of said central hull.

16. A method for minimizing the resistance of multihull vessels as in claim 14 wherein buoyancy is provided by a plurality of said central hull plus outer hull combinations arranged either in parallel or in series.

17. A method for minimizing the resistance of multihull vessels as in claim 14 further comprising:

longitudinally moving said outer hulls relative to said central hull wherein the relative positioning of said central hull and said outer hulls varies with ship speed whereby resistance due to wave interaction between said central hull and said outer hulls is minimized for a given range of ship speeds.

* * * * *

UNITED STATES PATENT AND TRADEMARK OFFICE
CERTIFICATE OF CORRECTION

PATENT NO.  : 5,178,085
DATED       : January 12, 1993
INVENTOR(S) : Chun-Che Hsu It is certified that error appears in the above-identified patent and that said Letters Patent is hereby corrected as shown below:

Column 1, line 31, cancel "small" and insert therefor --Small--; line 32, cancel "(SWATH" and insert therefor --(SWATH)--.

Column 3, line 38, cancel "80" and insert therefor --50--.

Column 5, lines 61-66, right-hand side of equation (1), that portion of the equation reading:

for An < Xn <    should read:    for An < Xn <
    Bn (1)                                Bn              (1)

Column 6, line 9, cancel "sub-"; line 10, cancel " script" and insert therefor --subscript--; line 17, cancel "canterlines" and insert therefor --centerlines--.

Column 7, line 3, cancel "31" and insert therefor --34--; line 32, cancel "33 generally," and insert therefor --33. Generally,--; line 48, cancel "33 by" and insert therefor --33. By--.

Column 8, line 21, cancel "on" and insert therefor --On--.

Column 13, (claim 1) line 50, cancel "synnetric" and insert therefor --symmetric--.

Signed and Sealed this

Thirtieth Day of November, 1993

Attest:

BRUCE LEHMAN

*Attesting Officer*

*Commissioner of Patents and Trademarks*